(12) United States Patent
Harding et al.

(10) Patent No.: US 7,936,426 B2
(45) Date of Patent: May 3, 2011

(54) TRANSFLECTIVE LCD COMPRISING A PATTERNED RETARDATION FILM

(75) Inventors: Richard Harding, Hants (GB); Stephan Derow, Griesheim (DE); Mark Verrall, Shilin (TW); Shirley Ann Marden, Poole Dorset (GB); Rick Hamilton, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 516 days.

(21) Appl. No.: 11/658,595

(22) PCT Filed: Jul. 1, 2005

(86) PCT No.: PCT/EP2005/007108
§ 371 (c)(1),
(2), (4) Date: Oct. 3, 2008

(87) PCT Pub. No.: WO2006/010431
PCT Pub. Date: Feb. 2, 2006

(65) Prior Publication Data
US 2009/0066890 A1   Mar. 12, 2009

(30) Foreign Application Priority Data
Jul. 28, 2004  (EP) .................................... 04017839

(51) Int. Cl.
*G02F 1/1335* (2006.01)
*G02F 1/13363* (2006.01)
(52) U.S. Cl. ....................................... 349/114; 349/117
(58) Field of Classification Search .......... 349/114–115, 349/106, 117; 428/1.3; 252/299.1, 299.61
See application file for complete search history.

(56) References Cited

U.S. PATENT DOCUMENTS

| | | | |
|---|---|---|---|
| 5,818,615 A | 10/1998 | Abileah et al. | |
| 6,731,360 B2 * | 5/2004 | Roosendaal et al. | 349/113 |
| 6,953,611 B2 * | 10/2005 | Hammond-Smith et al. | 428/1.3 |
| 7,435,357 B2 * | 10/2008 | Harding et al. | 252/299.1 |
| 7,700,643 B2 * | 4/2010 | Heeney et al. | 514/444 |
| 2004/0105059 A1 | 6/2004 | Ohyama et al. | |
| 2004/0174480 A1 | 9/2004 | Roosendaal et al. | |
| 2005/0024564 A1 | 2/2005 | Vogels et al. | |
| 2006/0177605 A1 | 8/2006 | Lub | |
| 2006/0193999 A1 * | 8/2006 | Verall et al. | 428/1.1 |
| 2007/0043048 A1 | 2/2007 | Bollbuck et al. | |
| 2008/0303000 A1 * | 12/2008 | Heeney et al. | 252/299.61 |

FOREIGN PATENT DOCUMENTS

| | | |
|---|---|---|
| WO | WO 03/014820 A1 | 2/2003 |
| WO | WO 03/019276 A2 | 3/2003 |
| WO | WO 2004/083913 A1 | 9/2004 |
| WO | WO 2004/089913 A1 | 10/2004 |

OTHER PUBLICATIONS

"Synthesis and properties of Photoisomerizable Derivatives of Isosorbide and Their Use in Cholesteric Filters" by J. Lub et al., Publiseh in Nov. 3, 2005.*

(Continued)

*Primary Examiner* — Akm E Ullah
(74) *Attorney, Agent, or Firm* — Millen, White, Zelano & Branigan, P.C.

(57) ABSTRACT

The invention relates to a transflective liquid crystal display (LCD) with a polymerised LC film comprising at least one photoisomerisable compound and having a pattern of regions with different retardation and/or different orientation of the LC material.

17 Claims, 3 Drawing Sheets

OTHER PUBLICATIONS

"Patterned retarders prepared by photoisomerization and photopolymerization of liquid crystalline films" by van der Zande et al., pp. 723-737, dated Jun. 2006.*

Doornkamp C et al: "Novel Transflective LCD with Ultra-wide Viewing Angle" SID Symposium Digest of Technical Papers, vol. 35, No. 1, May 2004, pp. 670-673, XP009056389 sections 2, 3, and 4 figure 4.

Van Der Zande B M I et al; "Technologies Towards Patterned Optical Foils" SID Symposium Digest of Technical Papers, vol. 34, No. 1, May 2003, pp. 194-197, XP009056390 section 2.

M. Kubo et al,: "Development of advanced TFT with good legibility . . . "; IDW' 99, p. 183-186, (2003).

H.-I. Baek et al.; "New Design of Transflective LCD . . . ", IDW'00 p. 41-43, (Apr. 1, 2002 ).

S.J. Roosendaal et al; "Novel High Performance Transflective LCD with . . . ", SID 03 Digest, p. 78-81.

S.-T. Wu et al.; "Reflective & Transflective LC Displays", SID Seminar M-8/3-M-8/18, (May 24, 2004).

* cited by examiner

TRANSFLECTIVE LCD COMPRISING A PATTERNED RETARDATION FILM

FIELD OF THE INVENTION

The invention relates to a transflective liquid crystal display (LCD) with a polymerised LC film obtained from a polymerisable LC material comprising at least one photoisomerisable compound and having a pattern of regions with different retardation and/or different orientation of the LC material.

BACKGROUND AND PRIOR ART

In prior art transflective liquid crystal displays (LCDs) have been reported. These displays can be operated both in transmissive mode, where light generated from a backlight is transmitted through the switchable LC cell towards the viewer, and reflective mode, where ambient light is reflected by a reflector behind the switchable LC cell and redirected through the LC cell towards the viewer. Because the backlight is needed only in dark ambience, these displays have lower power consumption than standard backlit displays. They are especially suitable for mobile applications, such as mobile phones, notebooks or palmtop devices like PDAs (personal digital assistant).

Kubo et al., IDW 1999, page 183-187, Roosendaal et al., SID Digest 2003, page 78-81 and WO 03/019276 A2 disclose active-matrix (AM) type transflective displays (or "Advanced TFT"), wherein each pixel is divided into a reflective and a transmissive subpixel. The transmissive subpixel has transparent electrodes that transmit light from a backlighting system into the switchable LC medium. The reflective subpixel has a transmissive front electrode and a reflective back electrode that reflects ambient light back towards the switchable LC medium. This type of patterned electrode structure can be achieved for example by "hole in mirror" technology. In the reflective subpixels light passes the LC layer twice so that it has a longer optical path and experiences higher retardation than in the transmissive subpixel, leading to different optical characteristics in the subpixels. Therefore it was proposed to reduce the LC cell gap in the reflective subpixel to approximately half the cell gap of the transmissive subpixel, so that both subpixels provide about the same total phase retardation. This is reported to improve transmission and backlight efficiency.

Roosendaal et al. and WO 03/109276 A2 further suggest to use a patterned quarter wave film (QWF) retarder to improve the viewing angle, brightness and efficiency. The QWF is patterned such it essentially covers only the reflective subpixels.

WO 03/019276 A2 and B. van der Zande et al., SID Digest 2003, page 194-197 disclose several methods to provide such a patterned QWF. According to a first method, a layer of an oriented reactive LC material is photopolymerised through a photomask and the non-polymerised material (in the covered parts of the layer) is afterwards removed, leaving only regions of oriented LC polymer material having the desired birefringence (and thus optical retardation). According to a second method, a layer of oriented reactive LC material is photopolymerised in two steps at different temperatures, where in the first step a photomask is used and the temperature is within the nematic phase of the LC material, and in the second step no photomask is used and the temperature is above the clearing point of the LC material, leaving regions having the desired birefringence and regions having no birefringence. According to a third method, a layer of oriented reactive LC material is provided on a patterned alignment layer inducing different orientation direction of the LC material which is then fixed by photopolymerisation. For example, the orientation direction in the regions serving as QWF is planar (i.e. parallel to the film plane) and at an angle of 45° to the transmission axis of the polarizer, whereas the orientation direction in the regions not serving as QWF is homeotropic (i.e. perpendicular to the film plane) or planar but parallel to the transmission axis of the polarizer.

However, the above methods have several disadvantages. Thus, the removal of non-polymerised material according to the first method requires an additional process step. Although it is not exactly disclosed in WO 03/019276 how the material can be removed, it is likely that additional reagents or mechanical will be necessary. The polmyerisation at different temperatures according to the second method requires temperature variation and control during the film manufacturing process. The third method requires to produce e.g. both regions with accurate uniform planar and homeotropic alignment in one film which is a difficult process. Thus, it is necessary to accurately create a patterned alignment layer, for example by creating uniform, large area surface gratings, creating patterned high/low surface energy substrates, or using photolithographic techniques, all of which imply complicated and costly manufacturing methods and materials. Another disadvantage is that defect alignment (e.g. splayed) can occur at the interface between the planar and homeotropic regions.

One aim of the present invention is to provide a patterned retardation film for use in transflective LCDs, especially in active matrix colour LCDs, which does not have the drawbacks of prior art films mentioned above, allows efficient conversion between linear and circular polarised states for light of different wavelengths and can be prepared by an easy method enabling accurate control of the optical properties. Another aim is to provide advantageous methods and materials for the preparation of such a retardation film. Another aim is to provide an improved transflective display comprising such a patterned retardation film. Other aims of the present invention are immediately evident to the person skilled in the art from the following detailed description.

The inventors have found that these aims can be achieved by providing displays, retardation films and methods according to the present invention.

Definition of Terms

The term 'film' includes rigid or flexible, self-supporting or free-standing films with mechanical stability, as well as coatings or layers on a supporting substrate or between two substrates.

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behaviour. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

For the sake of simplicity, the term 'liquid crystal material' is used hereinafter for both mesogenic and LC materials.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

The term 'reactive mesogen' (RM) means a polymerisable mesogenic or liquid crystal compound.

The term 'director' is known in prior art and means the preferred orientation direction of the long molecular axes (in case of calamitic compounds) or short molecular axis (in case of discotic compounds) of the mesogenic groups in an LC material.

In films comprising uniaxially positive birefringent LC material the optical axis is given by the director.

The term 'cholesteric structure' or 'helically twisted structure' refers to a film comprising LC molecules wherein the director is parallel to the film plane and is helically twisted around an axis perpendicular to the film plane.

The term 'homeotropic structure' or 'homeotropic orientation' refers to a film wherein the optical axis is substantially perpendicular to the film plane.

The term 'planar structure' or 'planar orientation' refers to a film wherein the optical axis is substantially parallel to the film plane.

The term 'tilted structure' or 'tilted orientation' refers to a film wherein the optical axis is tilted at an angle θ between 0 and 90° relative to the film plane.

The term 'splayed structure' or 'splayed orientation' means a tilted orientation as defined above, wherein the tilt angle varies in the direction perpendicular to the film plane, preferably from a minimum to a maximum value.

The average tilt angle $\theta_{ave}$ is defined as follows $$\theta_{ave} = \frac{\sum_{d'=0}^{d} \theta'(d')}{d}$$

wherein θ'(d') is the local tilt angle at the thickness d' within the film, and d is the total thickness of the film.

The tilt angle of a splayed film hereinafter is given as the average tilt angle $\theta_{ave}$, unless stated otherwise.

For sake of simplicity, an optical film with twisted, planar, homeotropic, tilted or splayed orientation or structure is hereinafter also referred to as 'twisted film', 'planar film', 'homeotropic film', 'tilted film' or 'splayed film', respectively.

Tilted and splayed films are also referred to as 'O plate'. A planar film is also referred to as 'A plate' or 'planar A plate'.

"E-mode" refers to a twisted nematic liquid crystal display (TN-LCD) where the input polarisation direction is substantially parallel to the director of the LC molecules when entering the display cell, i.e. along the extraordinary (E) refractive index. "O-mode" refers to a TN-LCD where the input polarisation is substantially perpendicular to the director when entering the display cell, i.e. along the ordinary (O) refractive index.

The term "polarisation direction" of a linear polariser means the direction of the plane of linear polarised light transmitted by the polariser, corresponding to the "transmission axis" of the polariser. In case of stretched plastic polariser films comprising e.g. dichroic iodine based dyes this is perpendicular to the stretch direction.

SUMMARY OF THE INVENTION

The invention relates to a transflective liquid crystal display (LCD) comprising
one or more pixels being divided into a reflective and a transmissive subpixel and comprising a layer of an LC medium that is switchable between different orientations upon application of an electric field,
a first substrate on the first side of the LC layer and a second substrate on the second side of the LC layer, said substrates optionally being covered by electrode layers,
a front polariser on the first side the LC layer,
optionally a back polariser on the second side of the LC layer, characterized in that it comprises at least one optical retardation film that is positioned between one of the substrates and the LC layer, is obtained from a polymerisable liquid crystal (LC) material comprising at least one photoisomerisable compound and has at least two regions with different retardation and/or orientation of the LC material.

The invention further relates to an optical multilayer component comprising an optical retardation film as described above and below, a colour filter on the first side of the retardation film, optionally an alignment layer between the retardation film and the colour filter, and optionally an electrode layer on the second side of the retardation film.

DETAILED DESCRIPTION OF THE INVENTION

Figure 1:
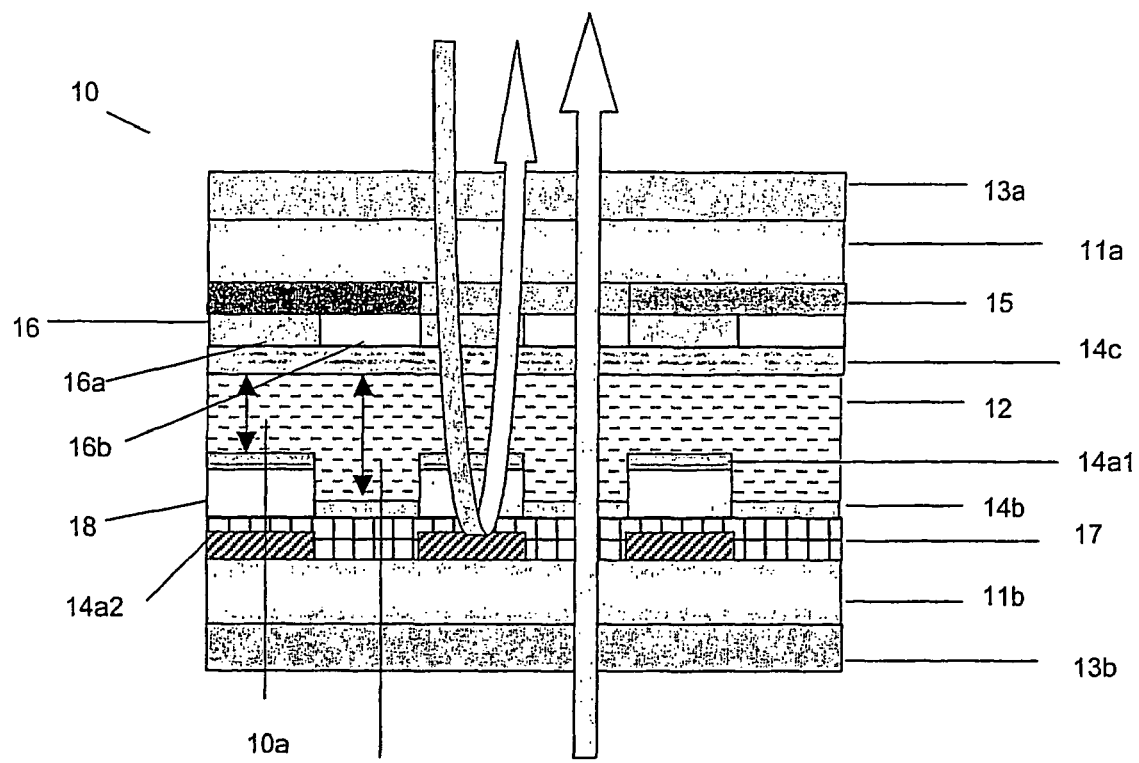
FIGS. 1 and 2 show transflective colour LCDs comprising a patterned retardation film according to preferred embodiments of the present invention.

The optical retardation film according to the present invention can be in transflective displays of the TN (twisted nematic), HTN (highly twisted nematic) or STN (super twisted nematic) mode, especially in AMD-TN (active matrix driven TN) displays. The display can also be of the VA (vertically aligned) MVA (multi-domain vertically aligned) or PVA (patterned vertically aligned) mode, IPS (in plane switching) mode, or OCB (optically compensated bend cell or optically compensated birefringence). In IPS displays, for example, electrodes are only provided on one side of the LC layer. In VA displays, for example, the LC molecules in the switchable layer are aligned perpendicular to the layer in the non-addressed state (i.e. no field applied), whereas in TN displays they are aligned parallel to the layer in the non-addressed state.

TN displays according to the invention typically have a twist angle in the range from 80 to 100°, preferably of approximately 90°. HTN displays preferably have a twist angle of 180°. STN displays preferably have a twist angle of approximately 270°. Especially preferred are TN and STN displays.

An LCD according to the invention preferably comprises a liquid crystal (LC) cell comprising the following elements a first and a second substrate plane parallel to each other, at least one of which is transparent to incident light,
   an array of nonlinear electric elements on one of said substrates which can be used to individually switch individual pixels of said LC cell, said elements being preferably active elements like transistors, very preferably thin film transistors (TFT),
   a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer,
   a first electrode layer provided on the inside of said first substrate,
   optionally a second electrode layer provided on the inside of said second substrate,
   optionally first and second alignment layers provided on said first and second electrodes,
   an LC medium that is switchable between at least two different orientations by application of an electric field,
a first linear polariser on the first side of the LC cell,
optionally a second linear polariser on the second side of the LC cell, and
at least one optical retardation film according to the present invention that is positioned between the first and second substrate of the LC cell ('incell'), is obtained from a polymerisable liquid crystal (LC) material comprising at least one photoisomerisable compound, and has a pattern of regions having different retardation and/or orientation of the LC material.

In a transflective LCD according to the present invention the retardation film is preferably provided between the substrates forming the switchable LC cell and containing the switchable LC medium ("incell" application). Compared to conventional displays where optical retarders are usually placed between the LC cell and the polarisers, incell application of an optical retardation film has several advantages. For example, a display where the optical film is attached outside of the glass substrates forming the LC cell usually suffers from parallax problems, which can severely impair viewing angle properties. If the retardation films is prepared inside the LC display cell, these parallax problems can be reduced or even avoided.

Preferably the incell retardation film is positioned between the colour filter and the LC medium, very preferably between the colour filter and the corresponding proximate electrode layer, or if a planarisation layer is present, between the colour filter and the planarisation layer.

The patterned retardation film preferably comprises regions having a defined on-axis retardation (with a value <0 or >0) and regions having no on-axis retardation. In the retarding regions of the film the optical axis is preferably parallel to the film plane (A-plate symmetry). In the non-retarding regions the film comprises for example an optically isotropic material, or the optical axis is for example perpendicular to the film plane (C-plate symmetry).

The thickness of the retardation film is preferably from 0.5 to 3.5 microns, very preferably from 0.6 to 3 microns, most preferably from 0.7 to 2.5 microns.

The on-axis retardation (i.e. at 0° viewing angle) of the retardation film is preferably from 60 nm to 400 nm, especially preferably from 80 nm to 350 nm, most preferably from 90 to 200 nm.

The retardation film in the transflective LCD according to the present invention is used to convert between linear and circular polarised light, and is thus preferably a quarter wave retardation film (QWF), i.e. having a retardation value of approximately 0.25 times of the wavelength of incident light, very preferably an achromatic QWF (AQWF). Very preferably the retardation film has an on-axis retardation from 90 to 200 nm, most preferably from 100 to 175 nm.

In another preferred embodiment, the LCD comprises a QWF and an additional half wave retardation film (HWF), i.e. having a retardation of approximately 0.5 times of the wavelength of incident light. The HWF is used together with the QWF to produce an AQWF. Preferred HWFs have retardation values from 180 to 400 nm, very preferably from 200 to 350 nm.

The HWF can be applied as incell film like the QWF between the transparent substrates, e.g. directly on top of the colour filter, with the QWF then aligned and oriented on top of the HWF. Optionally an alignment layer is present between the QWF and the HWF. Alternatively the HWF is applied outside the LC cell.

The assembly of an LCD according to a preferred embodiment of the present invention is schematically depicted in FIG. 1. The top of FIG. 1 corresponds to the front side of the display, i.e. the side of the viewer. The bottom of FIG. 1 to the back side of the display, i.e. the side of the backlight. FIG. 1 exemplarily shows one pixel 10 of the LCD, comprising a layer of a switchable LC medium 12 confined between two transparent, plane parallel substrates 11a/b, like for example glass substrates, and two polarisers 13a/b with crossed polarisation directions sandwiching the substrates.

The display further comprises a transparent electrode 14c on the front side of the LC layer and a pattern of reflective electrodes 14a and transparent electrodes 14b on the back side of the LC layer, thereby forming two sets of reflective subpixels 10a and transmissive subpixels 10b. The transparent electrodes 14c/14b are for examples layers of Indium Tin Oxide (ITO). The reflective electrode 14a comprises for example an ITO layer 14a1 and a reflective layer 14a2 which redirects light transmitted through the LC medium back towards the viewer (indicated by the curved arrow). The reflective layer 14a2 is for example a metal layer (e.g. Al) or can be formed as a mirror with holes (the mirror areas being in the reflective subpixels and the holes in the transmissive subpixels). The electrode layer 14a1 and the mirror 14a2 can be adjacent layers, or spatially separated as shown in FIG. 1.

The display further comprises a colour filter 15 with red, green and blue pixels and a patterned incell retardation film 16. The incell retarder 16 has a pattern of regions 16a having a defined retardation (with a value <0 or >0) and regions 16b having no on-axis retardation. The retarding regions 16a cover the reflective subpixels 10a and the non-retarding regions 16b cover the transmissive subpixels 10b.

If the display is of the active-matrix type, as shown in FIG. 1, it also comprises an array of nonlinear electric elements 17 which are used to individually switch individual pixels, like for example TFTs, on one side of the LC cell, preferably on the side opposite to that of the colour filter 15. It is possible that the TFT layer 17 is on the back side and the colour filter 15 on the front side, as shown in FIG. 1, or vice versa.

In colour active matrix displays, the mirror 14a2 can be built for example on the TFT layer (if the colour filter is on the front substrate) or on the colour filter layer (if the TFT layer is on the front substrate).

The reflective and transmissive subpixels 10a/b preferably have different cell gaps, as indicated by the double arrows in FIG. 1. Preferably the cell gap of the transmissive subpixel 10b is two times the cell gap of the reflective subpixel 10a.

To achieve a different cell gap, the reflective subpixel comprises for example a step 18 which can be formed e.g. from a clear resin (like a photoresist). The step 18 can be present on the colour filter side of the LC layer, or on the side of the LC layer opposite to that of the colour filter as shown in FIG. 1.

The electrodes 14a/b/c may also be covered by alignment layers (not shown) to induce or enhance the desired surface alignment in the LC medium 12. Optionally there is also an alignment layer (not shown) provided between the colour filter 15 and the patterned incell retardation film 16. The display also comprises a backlight (not shown) on its back side.

As the LCD according to the present invention is a transflective display it can operate both in a reflective and transmissive mode. The operation of an LCD according to the present invention and as shown in FIG. 1 is exemplarily described below for a TN mode LCD with approximately 90° twist angle, wherein the patterned in cell retarder 16 is a film having QWF regions 16a and zero retardation regions 16b.

Additional information about the operation of the LCD, like for example the selection and optimization of display parameters like the cell gap d, the twist angle $\phi$ and birefringence $\Delta n$ of the LC medium, can be taken from Roosendaal et al., SID Digest 2003, page 78-81 and WO 03/019276 A2.

In the bright state (without an electric field applied) in the reflective subpixels 10a ambient light entering the display from the top is polarised by the front linear polariser 13a. The linear polarised light is converted to circularly polarised light by the QWF regions 16a of the patterned incell retarder and passes through the LC medium 12.

Due to the smaller cell gap of the reflective subpixel, which is preferably only half the cell gap of the transmissive subpixel, the light only experiences a retardation $d/2 \cdot \Delta n$ when passing the LC medium 12 so that the circularly polarised light is converted into substantially linear polarised light (depending on the cell parameters the light may not be completely linear but slightly elliptically polarised).

The mirror 14a2 reflects the light back while preserving its polarisation state and direction. The light passes again through the LC medium 12 where it is converted back to circularly polarised light, and passes again through the patterned incell QWF 16 which converts it to linear polarised light. This linear polarised light can then pass again through the front polariser 13a and is seen by an observer.

The transmissive subpixels in the bright state (field-off) behave like a standard TN cell. The regions of the patterned incell retarder 16b covering the transmissive subpixels have no on-axis retardation and therefore do not change the polarisation state of the light. Thus, light emitted from the backlight enters the display from the back side and is polarised by the back linear polariser 13b. When passing through the LC medium 12 it experiences a retardation of $d \cdot \Delta n$ and remains linear polarised, however its plane of polarisation is twisted at 90° so that it passes the front polariser 13a and is seen by an observer.

In the dark state (with an electric field applied) in the reflective subpixels ambient light entering from the top is polarised by the front linear polariser 13a. It is converted to circularly polarised light by the patterned incell QWF 16a and passes through the (homeotropically oriented) LC medium 12 with its polarisation state and direction substantially unchanged. When reflected back from the mirror 14a2 it remains circularly polarised but its polarisation sense is reversed (e.g. from RH to LH). It is then converted by the patterned incell QWF 16a to linear polarised light, but now with perpendicular polarisation direction so that it is blocked by the crossed front polariser 13a.

In the dark state (field-on) the transmissive subpixels also behave like a standard TN cell. Light emitted from the backlight is polarised by the back linear polariser 13b and passes through the non-retarding regions of the patterned incell retarder 16b and through the LC medium 12 with its polarisation direction substantially unchanged, so that it is blocked by the crossed front polariser 13a.

Figure 2:
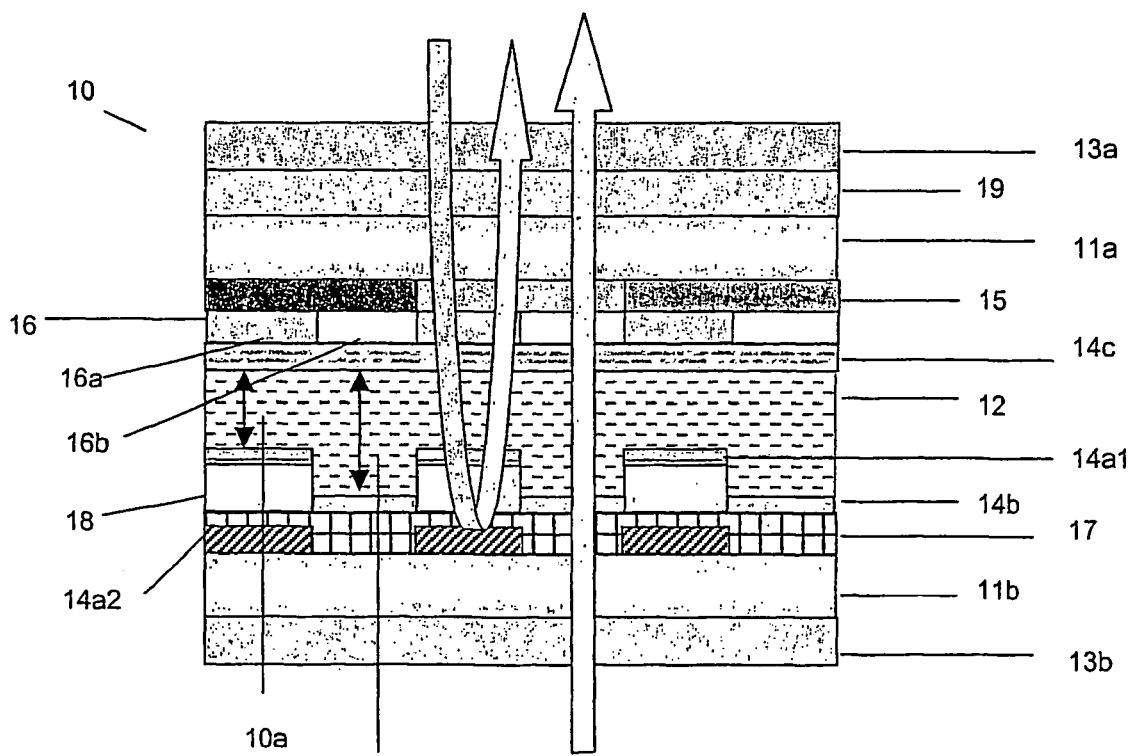

FIG. 2 exemplarily depicts the pixel of a transflective LCD according another preferred embodiment of the invention, comprising the components shown in FIG. 1 and additionally comprising a HWF 19 at the front side of the LCD, which together with the incell QWF 16 works as AQWF.

The linear polarisers 13a/b are for example standard absorption polarisers comprising e.g. stretched, dye-doped plastic films. It is also possible to use linear polarisers comprising a polymerised LC material with uniform planar orientation and a dichroic dye absorbing visible light, as described for example in EP-A-0 397 263.

The polarisers 13a/b and the HWF 18 can be attached to the substrates 11a/b by adhesive layers (not shown), like commercially available PSA films (pressure sensitive adhesives).

In a preferred embodiment the retardation film is an achromatic QWF (AQWF) or broadband or wideband QWF, which converts linearly polarized light into circular polarized light over a broader wavelength band in the visible spectrum, preferably for all visible wavelengths. Preferably the AQWF according to this embodiment has a retardation that is substantially a quarter of the wavelength of light incident on said AQWF, when measured at a wavelength of 450 nm, 550 nm and 650 nm, respectively. The term "substantially a quarter of a wavelength" means that the ratio $r/\lambda$, wherein r is the retardation of the AQWF and $\lambda$ is the wavelength of light, is in the range from 0.2 to 0.3, preferably from 0.22 to 0.28, most preferably from 0.24 to 0.26. The retardation r is defined as $r = d \cdot (n_x - n_y)$, wherein d is the film thickness and $n_x$ and $n_y$ are the main refractive indices in the plane of the film.

As mentioned above, an AQWF can be formed for example by providing incell or external QWF and HWF layers directly adjacent to each other, or separated by one or more transparent, non-retarding layers (e.g. an adhesive layer). The AQWF can be prepared for example as described in EP-A-1 363 144, by combining a QWF and a HWF both comprising polymerised LC material with planar orientation, which are arranged parallel to each other such that their optical axes are oriented at an angle of from 40 to 80°, preferably from 55 to 65°, most preferably of 50° relative to each other.

In another preferred embodiment, the optical retardation film (16) is a QWF film that additionally exhibits a pattern of R-, G- and B-pixels with three different retardations covering the reflective subpixels (10a), wherein the retardation in the R-, G- and B-pixels of the film is selected such that the efficiency of converting linearly polarised light into circularly polarised light is optimised for the colour red (R), green (G) or blue (B), respectively. The retardation film (16) is positioned such that its R-, G- and B-pixels cover the corresponding reflective R-, G- and B-subpixels of the display.

In such a retardation film the retardation values in the R-, G- and B-pixels are preferably selected as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

Another aspect of the invention relates to an optical component as exemplarily and schematically depicted in FIG. 3A, comprising a patterned optical retardation film 16 as described above and below, a colour filter 15 on the first side of the retardation film, optionally an alignment layer 20 between the retardation film and the colour filter, and optionally an electrode layer 14, e.g. of transparent ITO, on the second side of the retardation film (i.e. the side not adjacent to the colour filter). This optical component can be used in different types of displays.

Figure 3A:
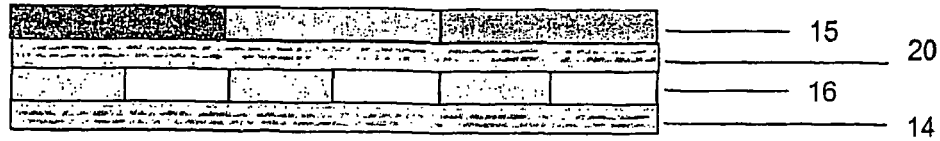
FIGS. 3A and 3B show optical components comprising a patterned retardation film according to preferred embodiments of the present invention.
Figure 3B:
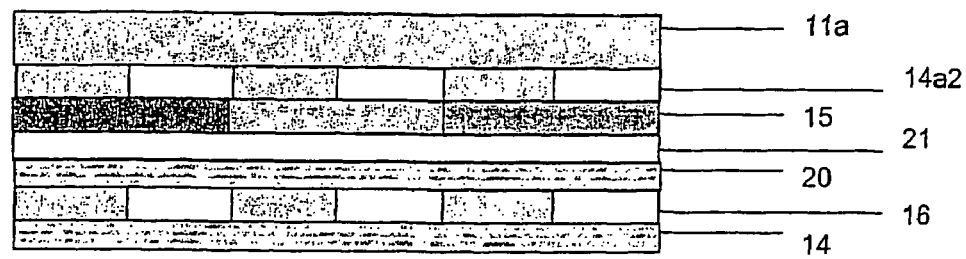
Figure 4:
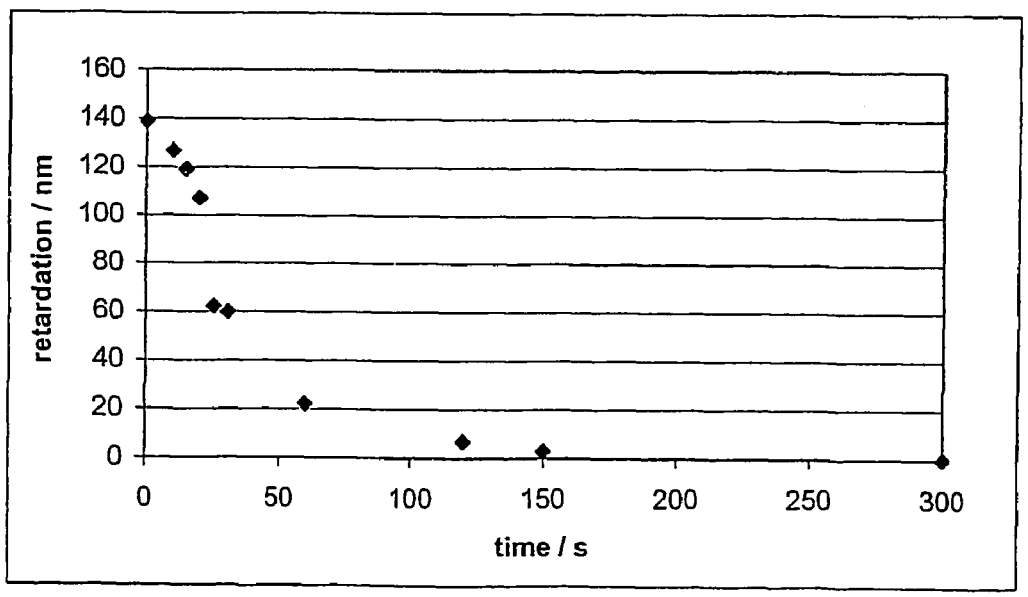
FIG. 4 shows the retardation versus irradiation time of a retardation film according to example 1 of the present invention.
Figure 5:
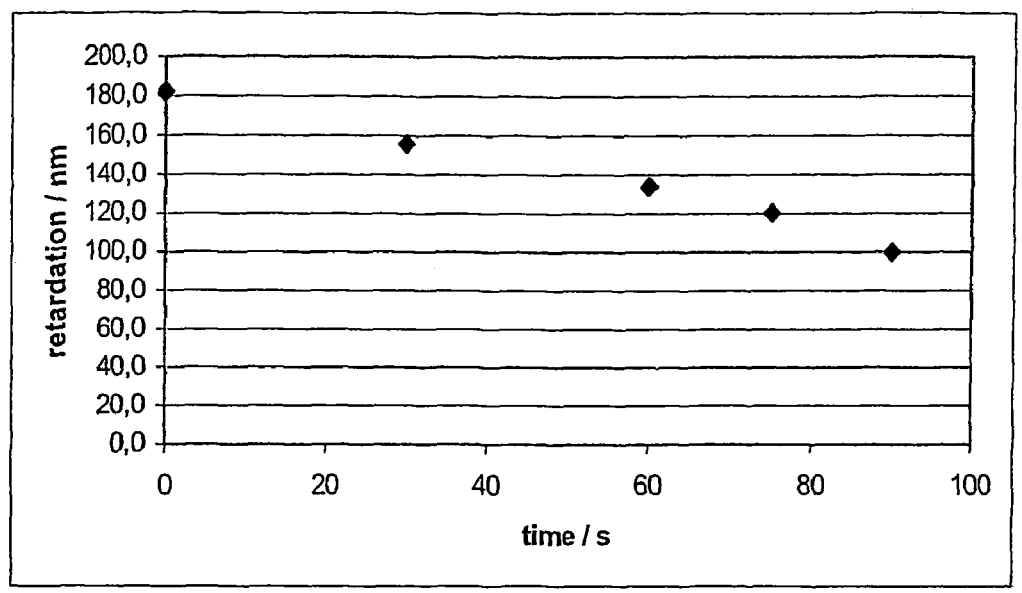
FIG. 5 shows the retardation versus irradiation time of a retardation film according to example 2 of the present invention.
Figure 6:
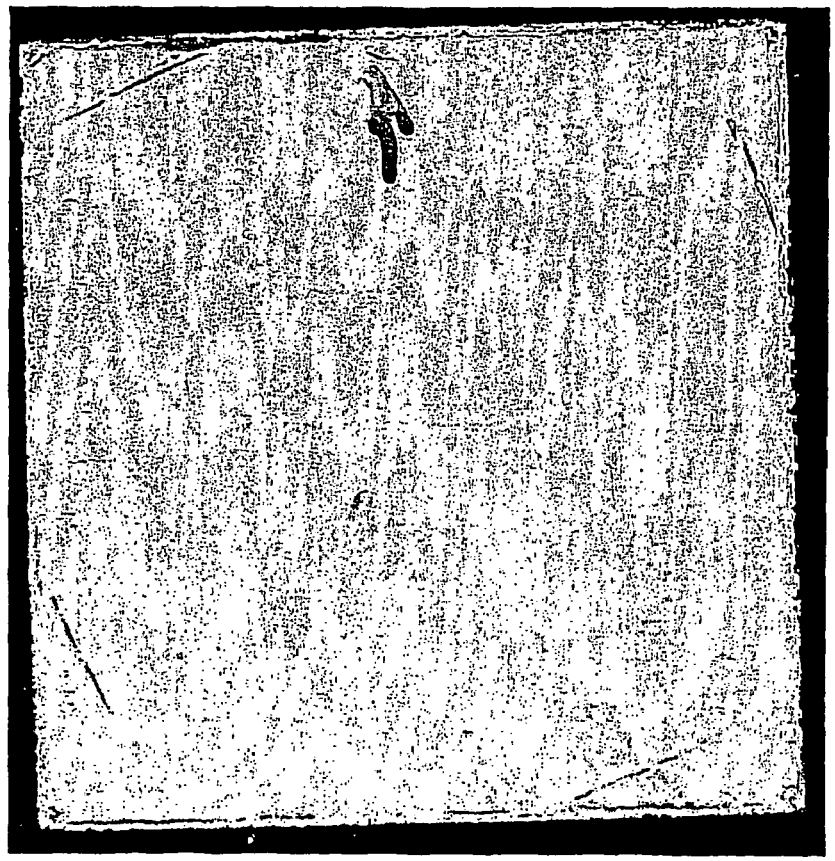
FIG. 6 shows a patterned retardation film according to example 2 of the present invention.

Another preferred optical component is shown in FIG. 3B, comprising the layers of FIG. 3A and further comprising a glass substrate 11, a mirror with holes 14a2 (corresponding to the pattern of reflective and transmissive subpixels), and optionally an overcoat (or planarisation layer) 21 between the alignment layer 20 and the patterned retardation film 16.

Patterned optical retardation films as used in the present invention and methods of their preparation are described in the non-prepublished patent application PCT/EP/2004/003547. Preferably the patterned film is prepared by a process comprising the following steps:

a) providing a layer of a polymerisable LC material comprising at least one photoisomerisable compound onto a substrate,
b) aligning the layer of LC material into planar orientation,
c) exposing the LC material in the layer, or in selected regions thereof, to photoradiation that causes isomerisation of the isomerisable compound, preferably UV radiation,
d) polymerising the LC material in at least a part of the exposed regions of the material, thereby fixing the orientation, and
e) optionally removing the polymerised film from the substrate, wherein the retardation and/or orientation of the LC material is controlled by varying the amount and/or type of the photoisomerisable compound, and/or by varying the intensity of the photoradiation and/or the exposure time.

Preferably the LC material is exposed to radiation that causes photoisomerisation and photopolymerisation, wherein the steps of photoisomerisation and photopolymerisation are carried out under different conditions, in particular under different gas atmospheres, especially preferably wherein photoisomerisation is carried out in the presence of oxygen and photopolymerisation is carried out in the absence of oxygen.

Especially preferred is a patterned film comprising polymerised liquid crystal (LC) material having at least two regions with different retardation and at least two regions with different orientation of the LC material, wherein said regions differing in retardation can also differ in orientation, or they can be different regions. Thus, for example the film has a pattern of a first and a second region, wherein the first and said second region differ in both retardation and orientation. In another embodiment the film has a pattern of a first, a second and a third region, wherein said first and second region differ in one of retardation and orientation, and said third region differs in at least one of retardation and orientation from at least one of said first and said second region. In another embodiment the film has a pattern of a first, a second, a third and a fourth region, each of which has a retardation different from each other region, and two of said regions have the same orientation. Other combinations are also possible.

Apart from the specific conditions and materials described in this invention, the steps a) to e) can be carried out according to standard procedures that are known to the expert and are described in the literature.

The polymerisable LC material comprises a photoisomerisable compound, preferably a photoisomerisable mesogenic or LC compound, very preferably a photoisomerisable compound that is also polymerisable. The isomerisable compound changes its shape, e.g. by E-Z-isomerisation, when exposed to radiation of a specific wavelength, e.g. UV-radiation. This leads to disruption of the uniform planar orientation of the LC material, resulting in a drop of its birefringence. Since the optical retardation of an oriented LC layer is given as the product d·Δn of the layer thickness d and the birefringence Δn of the LC material, the drop in birefringence also causes a decrease of the retardation in the irradiated parts of the LC material. The orientation and retardation of the LC material is then fixed by in-situ polymerisation of the irradiated regions or of the entire film.

Polymerisation of the LC material is achieved for example by thermal or photopolymerisation. In case photopolymerisation is used, the type of radiation used for photoisomerisation and for photopolymerisation of the LC material may be the same or different. In case radiation, e.g. UV-radiation, of a wavelength is used that can cause both photoisomerisation and photopolymerisation of the LC material, the steps of photoisomerisation and photopolymerisation are preferably carried out under different conditions, in particular under different gas atmospheres. In this case preferably photoisomerisation is carried out in the presence of oxygen, like e.g. in air, and photopolymerisation is carried out in the absence of oxygen, especially preferably under an inert gas atmosphere of e.g. nitrogen or a noble gas like argon. If the isomerisation step is performed in the presence of oxygen or in air, the oxygen scavenges the free radicals produced from the photoinitiator present in the material and thus prevents polymerisation. In the next step oxygen or air is removed and replaced by an inert gas such as nitrogen or argon, thereby allowing polymerisation to occur. This allows better control of the process steps.

The degree of isomerisation and thus the birefringence change in the layer of LC material can be controlled e.g. by varying the radiation dose, i.e. the intensity, exposure time and/or power of the radiation. Also, by applying a photomask between the radiation source and the LC layer it is possible to prepare a film with a pattern of regions or pixels having specific values of the retardation that differ from each other. For example, a film comprised of two different values of retardation can be created using a simple, monochrome mask. A more complicated film exhibiting multiple regions of different retardation can be created using a grey-scale mask. After the desired retardation values are achieved the LC layer is polymerised. In this way it is possible to create a polymer retardation film with values of retardation ranging from that of the initial LC layer to zero. The value of retardation for the initial layer of LC material is controlled by appropriate selection of the layer thickness and the type and amounts of the individual components of the LC material.

The polymerisable LC material is preferably a nematic or smectic LC material, in particular a nematic material, and preferably comprises at least one di- or multireactive achiral RM and optionally one or more than one monoreactive achiral RMs. By using di- or multireactive RMs a crosslinked film is obtained wherein the structure is permanently fixed, and which exhibits high mechanical stability and high stability of the optical properties against external influences like temperature or solvents. Films comprising crosslinked LC material are thus especially preferred.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful polymerisable mesogenic compounds (reactive mesogens) are shown in the following lists which should, however, be taken only as illustrative and is in no way intended to restrict, but instead to explain the present invention:

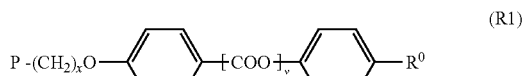
(R1)

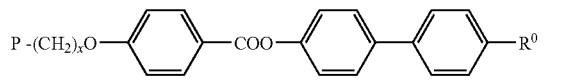
(R2)

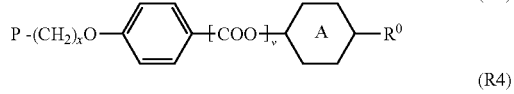
(R3)

(R4)

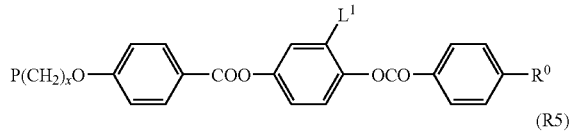
(R5)

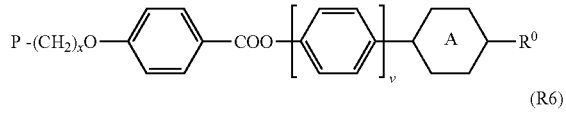
(R6)

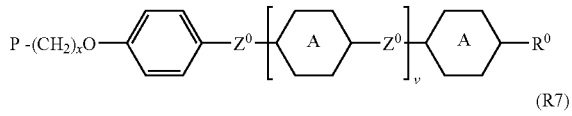
(R7)

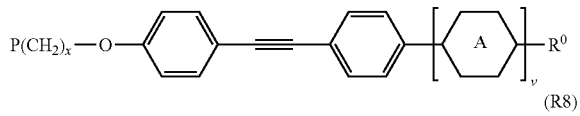
(R8)

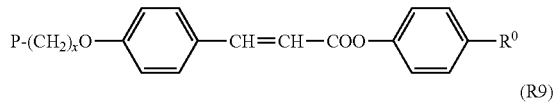
(R9)

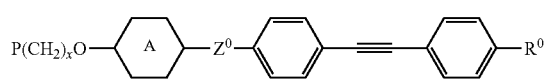

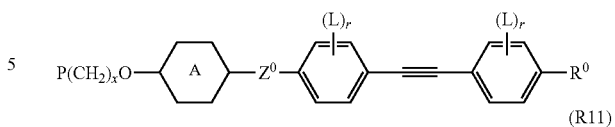
(R10)

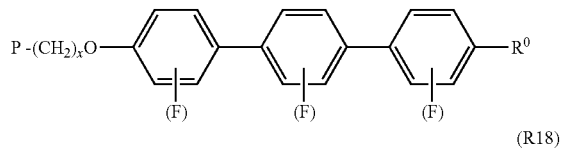
(R11)

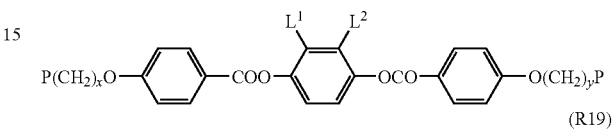
(R18)

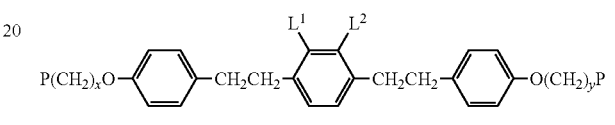
(R19)

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ is —COO—, —OCO—, —CH$_2$CH$_2$—, —CH═CH—, —C≡C— or a single bond, $R^0$ is a polar group or an unpolar group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

Especially preferred are mixtures comprising one or more polymerisable compounds comprising an acetylene or tolane group with high birefringence, like e.g. compounds of formula Ig above. Suitable polymerisable tolanes are described for example in GB 2,351,734.

Suitable photoisomerisable compounds are known in prior art. Examples of photoisomerisable compounds include azobenzenes, benzaldoximes, azomethines, stilbenes, spiropyrans, spirooxadines, fulgides, diarylethenes, cinnamates. Further examples are 2-methyleneindane-1-ones as described for example in EP 1 247 796, and (bis-)benzylidenecycloalkanones as described for example in EP 1 247 797.

Especially preferably the LC material comprises one or more cinnamates, in particular cinnamate reactive mesogens (RMs) as described for example in U.S. Pat. No. 5,770,107 (P0095421) and EP 02008230.1. Very preferably the LC material comprises one or more cinnamate RMs selected of the following formulae

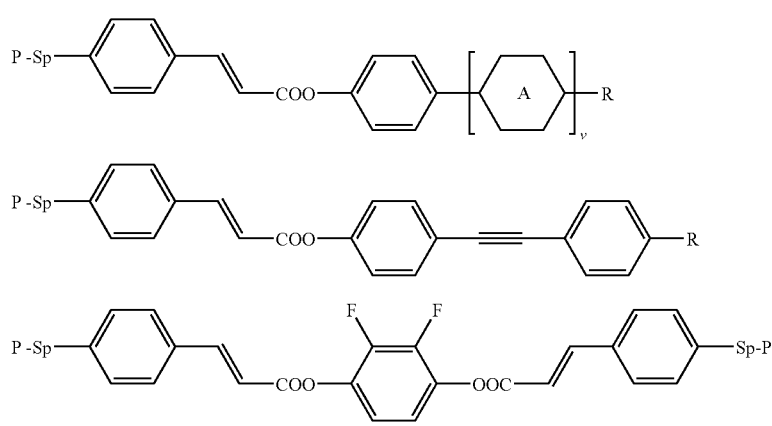

wherein P, A and v have the meanings given above, L has one of the meanings as defined above, Sp is a spacer group, like for example alkylene or alkyleneoxy with 1 to 12 C-atoms, or a single bond, R is a polar or unpolar group $R^0$ as defined above or denotes P-Sp.

Especially preferred are cinnamate RMs containing a polar terminal group $R^0$ as defined above. Very preferred are cinnamate RMs of formula III and IV wherein R is a polar group $R^0$.

The photoradiation used to cause photoisomerisation in the LC material depends on the type of photoisomerisable compounds, and can be easily selected by the person skilled in the art. Generally, compounds that show photoisomerisation induced by UV-radiation are preferred. For example, for cinnamate compounds like those of formula III, IV and V, typically UV-radiation with a wavelength in the UV-A range (320-400 nm) or with a wavelength of 365 nm is used.

It was found that polymerisable LC materials containing a high amount of photoisomerisable compounds are especially useful to the purpose of the present invention, as these materials allow to easily control and adjust the retardation of the optical retardation film. For example, an oriented layer of LC mixture containing a high amount of photoisomerisable compounds, which is subjected to radiation inducing photoisomerisation, shows a large decrease in retardation with increasing irradiation time. In such a material the retardation can be altered within a broader range of values and can be controlled more accurately, e.g. by varying the irradiation time, compared to a material showing only a slight change of retardation.

Thus, according to a preferred embodiment of the present invention, the polymerisable component of the polymerisable LC material comprises at least 12 mol % of photoisomerisable compounds, preferably cinnamate RMs, most preferably selected from formula III, IV and V.

The term 'polymerisable component' refers to the polymerisable mesogenic and non-mesogenic compounds in the total polymerisable mixture, i.e. not including other non-polymerisable components and additives like initiators, surfactants, stabilizers, solvents and the like.

Preferably the polymerisable component of the LC material comprises 12 to 100 mol %, very preferably from 40 to 100 mol %, in particular from 60 to 100 mol %, most preferably from 80 to 100 mol % of photoisomerisable compounds, preferably cinnamate RMs, most preferably selected from formula III, IV and V.

In another preferred embodiment, the polymerisable component of the LC material comprises from 20 to 99 mol %, preferably from 30 to 80 mol %, most preferably from 40 to 65 mol % of photoisomerisable compounds, preferably cinnamate RMs, most preferably selected from formula II, IV and V.

In another preferred embodiment, the polymerisable component of the LC material comprises 100 mol % photoisomerisable RMs, preferably cinnamate RMs, most preferably selected from formula III, IV and V.

The tilt angle θ of LC-molecules (directors) in the polymerised film can be determined from retardation measurements. These measurements show that, if the LC material is exposed to the photoirradiation that is used for photoisomerisation for a longer time, or to a higher radiation intensity, its original planar orientation changes into tilted or splayed orientation. Remarkably, these splayed films do not exhibit reverse tilt defects, which are normally associated with splayed LC films formed on a low pretilt substrate. Therefore, the method according to the present invention provides an elegant way of obtaining a uniform, splayed retardation film.

Thus, according to another preferred embodiment of the present invention, the orientation of the LC material in the film is controlled by varying the irradiation time and/or intensity of the photoradiation used to cause isomerisation in the LC material. This preferred embodiment also relates to a method of preparing a polymerised LC film having splayed structure, and showing a reduced number of reverse tilt defects, or even being free of tilt defects, by varying the orientation in a layer of polymerisable LC material having planar orientation as described in steps a) to e) above.

This embodiment also relates to a splayed film obtained by said method, preferably having a thickness of less than 3 μm, very preferably from 0.5 to 2.5 μm.

The optimum irradiation time and radiation intensity depend on the type of LC material used, in particular on the type and amount of photoisomerisable compounds in the LC material.

As mentioned above, the decrease in retardation of a polymerisable LC material containing for example cinnamate RMs is greater for mixtures with high concentrations of cinnamate RMs. On the other hand, irradiation of the polymerisable LC material with a high dose of UV-light leads to the formation of splayed films.

Thus, another method to control the change of retardation and orientation in the LC layer is by defining the maximum decrease of retardation achieved by photoisomerisation, whilst still maintaining the planar orientation in the LC layer, as a function of the concentration of photoisomerisable compounds.

In a polymerisable LC mixture for use in a method of preparing a film according to the present invention, where an orientation change from planar to splayed is not required, the polymerisable component preferably comprises 40 to 90 mol %, very preferably 50 to 70% of photoisomerisable cinnamate compounds of formula III, IV and/or V.

In a polymerisable LC mixture for use in a method of preparing a film according to the present invention, where an orientation change from planar to splayed is desired, the polymerisable component preferably comprises 100% of photoisomerisable cinnamate compounds of formula III, IV and/or V.

Also, a polymerisable LC mixture for use in a method of preparing a film according to the present invention, where an orientation change from planar to splayed is desired, preferably does not comprise photoisomerisable cinnamate compounds of formula III or IV wherein R is an alkyl group.

By using photomask techniques, it is possible to use the method according to this second preferred embodiment to prepare patterned films comprising regions with different orientation and/or different retardation.

Especially preferred is a film comprising at least one region having planar orientation and at least one region having splayed orientation.

Further preferred is a film comprising at least one region wherein the retardation is zero.

The method described above can also be used to prepare a multilayer comprising multiple polymerised LC films, each having with different orientation of the LC material, by a method comprising the following steps:

A) providing a first layer of a polymerisable LC material comprising at least one photoisomerisable compound onto a substrate,
B) aligning the first layer of LC material into planar orientation and polymerising the material, thereby fixing the orientation,
C) providing a second layer of LC material as described in steps A) and B), wherein the first layer serves as substrate, wherein the LC material in at least one of said first and second layers, or in selected regions thereof, before polymerisation is exposed to photoradiation that causes isomerisation of the isomerisable compound, preferably UV radiation.

Especially preferred is a multilayer comprising two or more, very preferably two, three or four polymerised LC films.

For example, a first polymerised planar LC film is produced as described above. This film is used as substrate and subsequently coated with a second layer of the same LC mixture. The second layer is then also aligned into planar orientation. Thus, a stack comprising two planar polymerised LC films can be produced. If the second layer is irradiated e.g. with UV-light of a sufficient dose prior to polymerisation, it shows splayed structure. Thus, a stack comprising a planar and a splayed polymerised LC film can be produced.

If the LC mixture in the first layer is irradiated e.g. with UV-light of a sufficient dose prior to polymerisation, the first layer shows yields a splayed LC film. If a second layer of the same LC mixture is coated onto this splayed film and irradiated prior to polymerization, the second layer forms a homeotropically aligned layer, thus a stack of splayed and homeotropic films can be produced.

Especially preferred is a multilayer comprising at least one layer having planar orientation and at least one layer having splayed orientation.

Further preferred is a multilayer comprising at least one layer having splayed orientation and at least one region having homeotropic orientation.

It is also possible to combine the above methods to prepare a film that has a pattern of regions with different orientation and regions with different retardation.

It is also possible to combine the above methods to prepare a multilayer comprising two or more layers, at least one of which has a pattern of regions with different orientation and/or with different retardation.

To prepare a polymer film, the polymerisable LC mixture is preferably coated onto a substrate, aligned, preferably into planar orientation, isomerised to create the desired retardation or orientation pattern, and polymerised in situ, for example by exposure to heat or actinic radiation, to fix the orientation of the LC molecules. Alignment and curing are carried out in the LC phase of the mixture.

In the displays and optical components according to the present invention, the polymerisable and isomerisable LC material is preferably applied onto the colour filter serving as substrate or onto an alignment layer applied onto the colour filter.

The polymerisable LC material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable mesogenic material in a suitable solvent. This solution is then coated or printed onto the substrate, for example by spin-coating or printing or other known techniques, and the solvent is evaporated off before polymerization. In most cases it is suitable to heat the mixture in order to facilitate the evaporation of the solvent. As solvents for example standard organic solvents can be used the solvents can be selected for example from ketones like e.g. acetone, methyl ethyl ketone, methyl propyl ketone or cyclohexanone, acetates like e.g. methyl, ethyl or butyl acetate or methyl acetoacetate, alcohols like e.g. methanol, ethanol or isopropyl alcohol, aromatic solvents like e.g. toluene or xylene, halogenated hydrocarbons like e.g. di- or trichloromethane, glycols or their esters like e.g. PGMEA (propyl glycol monomethyl ether acetate), γ-butyrolactone, and the like. It is also possible to use binary, ternary or higher mixtures of the above solvents.

The initial alignment (e.g. planar alignment) of the polymerisable LC material can be achieved for example by rubbing treatment of the substrate onto which the material is coated, by shearing the material during or after coating, by application of an alignment layer, by magnetic or electric field to the coated material, or by the addition of surface-active compounds to the LC material. Reviews of alignment techniques are given for example by 1. Sage in "Thermotropic Liquid Crystals", edited by G. W. Gray, John Wiley & Sons, 1987, pages 75-77, and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

In a preferred embodiment the polymerisable LC material comprises an additive that induces or enhances planar alignment of the LC molecules on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very fluorocarbon surfactants, like for example the commercially available fluorocarbon surfactants Fluorad FC-171® (from 3M Co.), or Zonyl FSN® (from DuPont), and the surfactants described in GB 0227108.8.

The invention claimed is:

1. A transflective liquid crystal display (LCD), comprising
one or more pixels being divided into a reflective and a transmissive subpixel and comprising a layer of an LC medium that is switchable between different orientations upon application of an electric field,
a first substrate on the first side of the LC layer and a second substrate on the second side of the LC layer, said substrates optionally being covered by electrode layers,
a front polarizer on the first side the LC layer,
optionally a back polarizer on the second side of the LC layer,
at least one optical retardation film that is positioned between one of the substrates and the LC layer, obtained from a polymerizable liquid crystal (LC) material comprising at least one photoisomerisable compound, and having a set of first areas having an on-axis retardation >0 or <0 and set of second areas having no on-axis retardation, wherein said first areas cover reflective subpixels of the LCD and said second areas cover transmissive subpixels of the LCD, wherein in the retardation film the areas of no on-axis retardation comprise an optically isotropic material or material with C-plate symmetry.

2. The LCD according to claim 1, of TN (twisted nematic), HTN (highly twisted nematic), STN (super twisted nematic) or AMD-TN (active matrix driven TN) mode.

3. The LCD according to claim 1, having a twist angle of 80° to 100°.

4. The LCD according to claim 1, comprising
a liquid crystal (LC) cell comprising
a first and a second substrate plane parallel to each other, at least one of which is transparent to incident light,
an array of nonlinear electric elements on one of said substrates which can individually switch individual pixels of said LC cell,
a color filter array provided on one of said substrates, and having a pattern of different pixels transmitting one primary colors red, green and blue (R, G, B), said color filter optionally being covered by a planarization layer,
a first electrode layer provided on the inside of said first substrate,
optionally a second electrode layer provided on the inside of said second substrate,
optionally first and second alignment layers provided on said first and second electrodes,
an LC medium that is switchable between at least two different orientations by application of an electric field,
a first linear polarizer on the first side of the LC cell,
optionally a second linear polarizer on the second side of the LC cell, and
at least one optical retardation film that is positioned between the first and second substrate of the LC cell, obtained from a polymerisable liquid crystal (LC) material comprising at least one photoisomerizable compound, and a set of first areas having an on-axis retardation >0 or <0 and set of second areas having no on-axis retardation, wherein said first areas cover reflective subpixels of the LCD and said second areas cover transmissive subpixels of the LCD, wherein in the retardation film the areas of no on-axis retardation comprise an optically isotropic material or material with C-plate symmetry.

5. The LCD according to claim 4, wherein the optical retardation film is positioned between the color filter and a proximate electrode.

6. The LCD according to claim 5, further comprising an alignment layer between the optical retardation film and the color filter.

7. The LCD according to claim 1, wherein the retardation film is a quarter wave film (QWF).

8. The LCD according to claim 1, wherein the retardation film is an achromatic QWF (AQWF).

9. The LCD according to claim 1, comprising a half wave retardation film (HWF).

10. The LCD according to claim 1, comprising a color filter having a pattern of R-, G-, B-pixels, the optical retardation film being a QWF and exhibiting a pattern of R-, G- and B-pixels adjusted such that the efficiency of converting linearly polarized light into circularly polarized light is optimized for the color R, G and B, respectively, said optical retardation film being positioned such that each of its R-, G- and B-pixels covers the corresponding R-, G- and B-pixels of the color filter.

11. The LCD according to claim 1, wherein the retardation film is obtained by a method comprising:
a) providing a layer of a polymerizable LC material comprising at least one photoisomerizable compound onto a substrate,
b) aligning the layer of LC material into planar orientation,
c) exposing the LC material in the layer, or in selected regions thereof, to photoradiation that causes isomerization of the isomerizable compound,
d) polymerizing the LC material in at least a part of the exposed regions of the material, thereby fixing the orientation, and
e) optionally removing the polymerized film from the substrate.

12. An Optical component comprising a LCD according to claim 1, further comprising a glass substrate and a mirror with holes.

13. An optical component, suitable for use in a transflective display having reflective and transmissive subpixels, comprising a LCD according to claim 1.

14. The LCD according to claim 1, wherein the retardation film the areas of no on-axis retardation have an optical axis perpendicular to the film plane.

15. A Patterned film obtained from a polymerizable liquid crystal (LC) material comprising at least one photoisomerizable compound and comprising at least two regions having a set of first areas having an on-axis retardation >0 or <0 and set of second areas having no on-axis retardation, wherein said first areas cover reflective subpixels of the LCD and said second areas cover transmissive subpixels of the LCD, suitable for use as optical retardation film in a transflective color LCD having reflective and transmissive subpixels.

16. A Patterned film according to claim 15, comprising a layer of an LC medium that is switchable between different orientations upon application of an electric field,
a first substrate on the first side of the LC layer and a second substrate on the second side of the LC layer, said substrates optionally being covered by electrode layers,
a front polarizer on the first side the LC layer,
optionally a back polarizer on the second side of the LC layer,
at least one optical retardation film that is positioned between one of the substrates and the LC layer, obtained from a polymerizable liquid crystal (LC) material comprising at least one photoisomerizable compound, and having a set of first areas having an on-axis retardation >0 or <0 and set of second areas having no on-axis retardation, wherein said first areas cover reflective subpixels of the LCD and said second areas cover transmissive subpixels of the LCD wherein in the retardation film the areas of no on-axis retardation comprise an optically isotropic material or material with C-plate symmetry.

17. Optical component comprising at least one optical retardation film as defined in claim 16, a color filter on the first side of the retardation film, optionally an alignment layer between the retardation film and the colour filter, and optionally an electrode layer on the second side of the retardation film.

* * * * *